INVENTORS:
HERMANUS A. VEENHUIZEN
HERMAN J. VEENHUIZEN
BY [signature]
ATTORNEY

June 4, 1957 H. A. VEENHUIZEN ET AL 2,794,472
MANUALLY OPERATED PEELING MACHINE FOR POTATOES, CARROTS AND THE LIKE
Filed Dec. 9, 1953 2 Sheets-Sheet 2
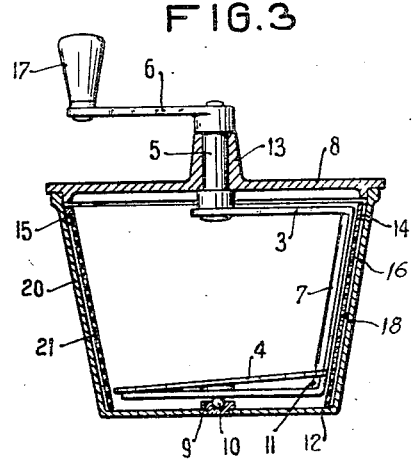
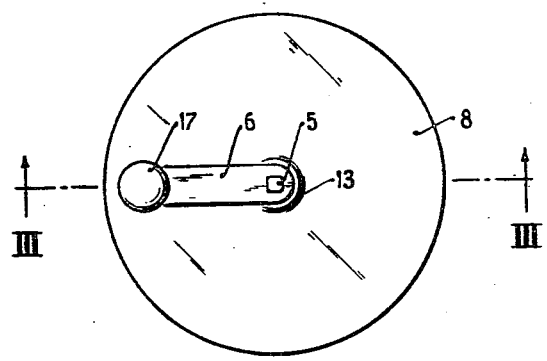
INVENTORS:
HERMANUS A. VEENHUIZEN
HERMAN J. VEENHUIZEN
ATTORNEY 
United States Patent Office 2,794,472
Patented June 4, 1957

2,794,472
MANUALLY OPERATED PEELING MACHINE FOR POTATOES, CARROTS AND THE LIKE

Hermanus A. Veenhuizen and Herman J. Veenhuizen, Hengelo, Netherlands

Application December 9, 1953, Serial No. 397,110

1 Claim. (Cl. 146—49)

This invention relates to a manually operated machine for peeling potatoes and like tubers, comprising a casing of cylindrical or truncated conical shape, in which a sleeve leaving a circular space with respect to the circumferential wall of the casing is located, said sleeve constituting an abrasive wall and being locked against rotation with respect to the wall of the casing, a shaft being mounted in said casing and being provided with a crank having a handle, said shaft carrying an abrasive disc located near the bottom of the casing.

Machines of this kind are known in which the shaft is located in the axis of the casing and with such machines the shaft has an unfavourable influence on the quality of the potatoes when peeling them. Said drawback is due to the fact that the potatoes form a parabolic surface under the action of the rotating disc so that the potatoes are jammed between the shaft and the sleeve near the bottom of the casing, whereby they are urged too heavily against the abrasive surface of the sleeve and, moreover, the potatoes are bruised by the pressure exerted on them, so that already after a relatively short time they obtain black and blue spots.

The invention has for its object to remove said drawback of a peeling machine of the kind referred to and to improve the operation of such a machine. According to the invention the shaft of the abrasive disc is constituted by a rod bent to a U-shape, the lower leg of said rod being parallel to the bottom of the casing and the upper leg of the rod being parallel to the top of the casing and the upright part of the rod being located at a small distance from and parallel to the circumferential wall of the sleeve, the abrasive disc being supported by the lower leg of the rod in inclined position with respect to the axis of the casing.

With said arrangement the axis of the casing is not occupied by the shaft so that the potatoes are not damaged during the peeling operation.

The invention will be further described with reference to the accompanying drawing, in which two embodiments of the peeling machine according to the invention are illustrated.

Fig. 3 is a sectional elevation on line III—III of Fig. 4 and on a smaller scale of a peeling machine having a casing shaped as a truncated cone.

Fig. 4 is a plan view of the machine shown in Fig. 3.

Figure 1:
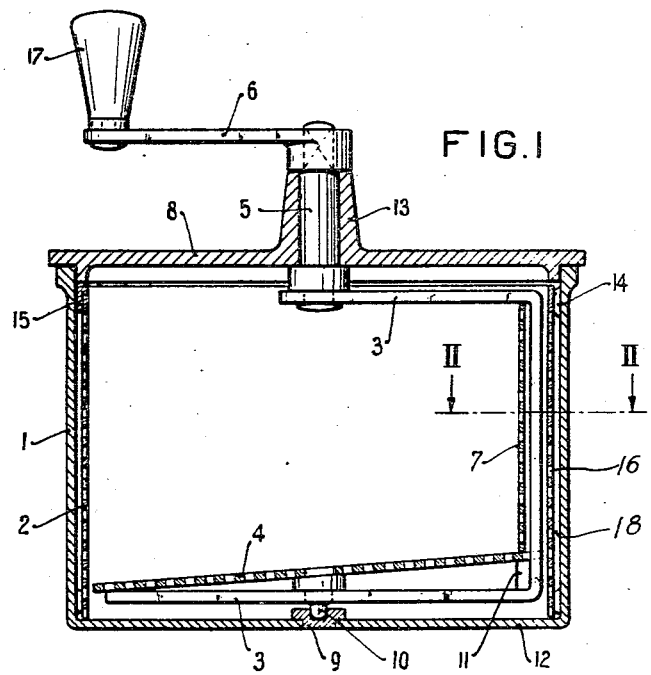
Fig. 1 is a sectional elevation taken on line I—I of Fig. 2 of a peeling machine provided with a cylindrical casing.
Figure 2:
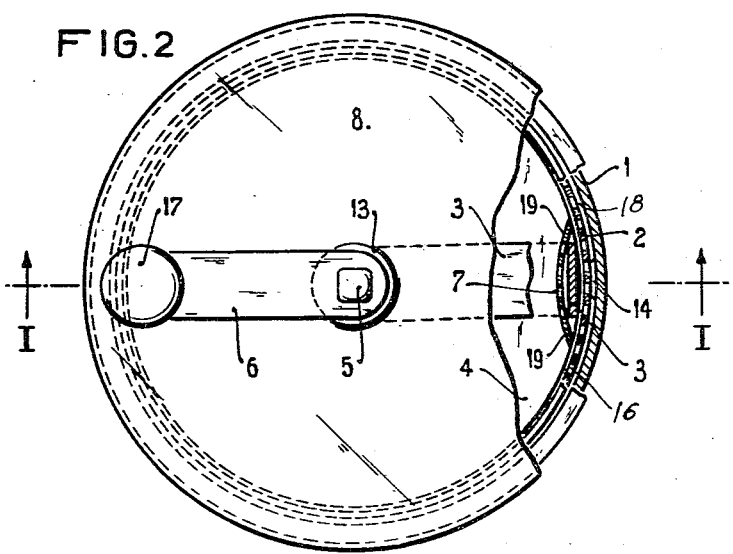
Fig. 2 is a plan view of the machine shown in Fig. 1, partly in section taken on line II—II in Fig. 1.

The peeling machine according to Fig. 1 is provided with a cylindrical casing 1, in which a perforated open bottomed sleeve 2 is removably mounted and secured against rotation. To this end a projection 14 is provided at the inner side of the casing and engages a bead 15 at the upper edge of the sleeve 2. The sleeve 2 has rough edged perforations 16 and is supported on the bottom 12 of the casing and leaves an annular spacing 18 with respect to the wall of the casing. The shaft consists of a rod 3 bent to a U-shape and carrying a perforated abrasive disc 4 secured and supported on a central stud 10 and a support 11. Rod 3 is secured to a journal 5 carrying a removable crank 6 provided with a handle 17.

The abrasive disc 4 is supported on rod 3 in such an inclined position that the upper side of the disc encloses an acute angle with the upright part of the rod 3. A slightly curved auxiliary abrasive wall 7 is secured at the inner side of the upright part of rod 3. The inner face of wall 7 is formed as an abrasive surface with the exception of the vertical marginal portions 19 of said wall as said portions should act as guiding faces for the potatoes.

Rod 3 is supported by the central stud 10 on a step bearing 9 mounted in the bottom 12 of the casing and the journal 5 of the rod is supported in a bearing 13 united with the cover 8 of the casing.

The potatoes to be peeled are put into the casing and to this end cover 8 is removed and thereafter the casing is filled with water until the upper layer of potatoes is half immerged.

For cleaning the machine the cover 8 together with the journal 5 and rod 3 with the abrasive disc 4 and the auxiliary abrasive wall 7 are removed from the casing, whereafter sleeve 2 may also be removed.

As shown in Fig. 3 the upright part of rod 3 is also directed according to the generating line of the sleeve 21 which in this embodiment is shaped as a truncated cone.

What we claim is:

A manually operated peeling machine for potatoes and like tubers, comprising a casing having a circumferential wall and a circumferentially walled sleeve, said sleeve being spaced with respect to said circumferential wall, said sleeve constituting an abrasive wall and being locked against rotation with respect to said circumferential wall, a rod mounted in said casing bent to a U-shape forming a lower leg and an upper leg and an upright part joining said legs, said lower leg being parallel to the bottom of said casing and said upper leg being parallel to the top of said casing and said upright part being located at a short distance from the parallel to said circumferential wall of said sleeve, said upright part having affixed thereto abrasive means, an abrasive disk supported on said lower leg in inclined position with respect to the axis of said casing, and a crank secured to said upper leg.

References Cited in the file of this patent

UNITED STATES PATENTS 1,641,993  Schaefer _____ Sept. 13, 1927

FOREIGN PATENTS 220,448  Great Britain _____ Aug. 21, 1924